United States Patent
Song et al.

(10) Patent No.: US 8,151,252 B2
(45) Date of Patent: Apr. 3, 2012

(54) COMPILER FRAMEWORK FOR SPECULATIVE AUTOMATIC PARALLELIZATION WITH TRANSACTIONAL MEMORY

(75) Inventors: Yonghong Song, Palo Alto, CA (US); Xiangyun Kong, Union City, CA (US); Spiros Kalogeropulos, Los Gatos, CA (US); Partha P. Tirumalai, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1077 days.

(21) Appl. No.: 12/035,828

(22) Filed: Feb. 22, 2008

(65) Prior Publication Data
US 2009/0217253 A1 Aug. 27, 2009

(51) Int. Cl.
*G06F 9/45* (2006.01)
(52) U.S. Cl. .......................... 717/140; 717/141; 717/143
(58) Field of Classification Search .................. 717/140, 717/141, 143
See application file for complete search history.

(56) References Cited

U.S. PATENT DOCUMENTS

| | | | | |
|---|---|---|---|---|
| 6,367,070 B1 * | 4/2002 | Haghighat et al. | ............ | 717/160 |
| 6,374,403 B1 * | 4/2002 | Darte et al. | .................... | 717/161 |
| 6,567,976 B1 * | 5/2003 | Wolf | ............................. | 717/160 |

OTHER PUBLICATIONS

Dennis, J. B. "A Parallel Program Execution Model Supporting Modular Software Construction", 1998, IEEE, p. 50-60.*

* cited by examiner

*Primary Examiner* — Qamrun Nahar
(74) *Attorney, Agent, or Firm* — Osha • Liang LLP

(57) ABSTRACT

A computer program is speculatively parallelized with transactional memory by scoping program variables at compile time, and inserting code into the program at compile time. Determinations of the scoping can be based on whether scalar variables being scoped are involved in inter-loop non-reduction data dependencies, are used outside loops in which they were defined, and at what point in a loop a scalar variable is defined. The inserted code can include instructions for execution at a run time of the program to determine loop boundaries of the program, and issue checkpoint instructions and commit instructions that encompass transaction regions in the program. A transaction region can include an original function of the program and a spin-waiting loop with a non-transactional load, wherein the spin-waiting loop is configured to wait for a previous thread to commit before the current transaction commits.

18 Claims, 5 Drawing Sheets

COMPILER FRAMEWORK FOR SPECULATIVE AUTOMATIC PARALLELIZATION WITH TRANSACTIONAL MEMORY

FIELD OF THE INVENTION

Embodiments of the invention are directed to compiler techniques that support speculative execution of program instructions.

BACKGROUND

As multi-core chips become more popular, their support for multi-threaded applications becomes more important. Hardware transactional memory is one such example. Various research projects have demonstrated that transactional memory can greatly reduce lock contention and hence improve multi-threaded application performance. However, little research has been done on transactional memory to help parallelize programs.

BRIEF SUMMARY

In example embodiments, a method for parallelizing execution of a computer program includes scoping program variables at compile time, including scoping scalar variables that are involved in an inter-loop non-reduction data dependence as shared, and inserting code into the program at compile time. The inserted code can include instructions for performing actions at run time of the program including determining loop boundaries at run time, and issuing checkpoint instructions and commit instructions that encompass transaction regions in the program. Each transaction region can include a function of the computer program (e.g. a function that performs work of the computer program) and a spin-waiting loop with a non-transactional load. In example embodiments, the spin-waiting loop waits for a previous thread to commit before the current thread commits. The resulting program, including the inserted code, can be stored and/or executed.

In example embodiments, the scoping can include scoping scalar variables that are involved only in intra-loop data dependence as private. A variable that is private based on dependence criteria inside a loop and that is used outside the loop, can be scoped as shared. In this document, if not specified explicitly, the dependence relation is considered to be a data dependence relation. A scalar variable that is defined in a last iteration of a loop and used outside the loop, can be scoped as copy-out. A scalar variable that is defined in a loop prior to a last iteration of the loop and used outside the loop, can be scoped as shared. In an example embodiment, a non-loop-index scalar variable that carries inter-loop data dependences is scoped as shared.

The inserted code can include instructions for causing a computer to perform, in response to a failure of a speculatively executed thread of the program, restarting the speculatively executed thread after a prior thread is done. The inserted code can include instructions for enabling each thread in the program to perform reduction and copy-out immediately after commit. The inserted code can include instructions for enabling a main thread in the program to perform reduction and copy-out for threads in the program in response to indications from the threads, wherein each of the indications indicates that a corresponding thread has committed. The inserted code can include instructions for enabling a main thread in the program to perform reduction and copy-out after all speculative threads in the program are done. Accordingly, in one reduction/copy-out scheme, each thread itself performs reduction/copy-out immediately after commit. In another reduction/copy-out scheme, the main thread eagerly performs reduction/copy-out in the sense that each slave thread will notify the main thread whenever reduction/copy-out operations can be conducted. In another reduction/copy-out scheme, the main thread lazily performs reduction/copy-out after all slave threads have committed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Insertion of code into a program can include adding code or instructions into the program. The program can also be enhanced or altered by providing links or other mechanism(s) within (or in connection with) the program, that enable the program to access and/or execute additional code.

Figure 1:
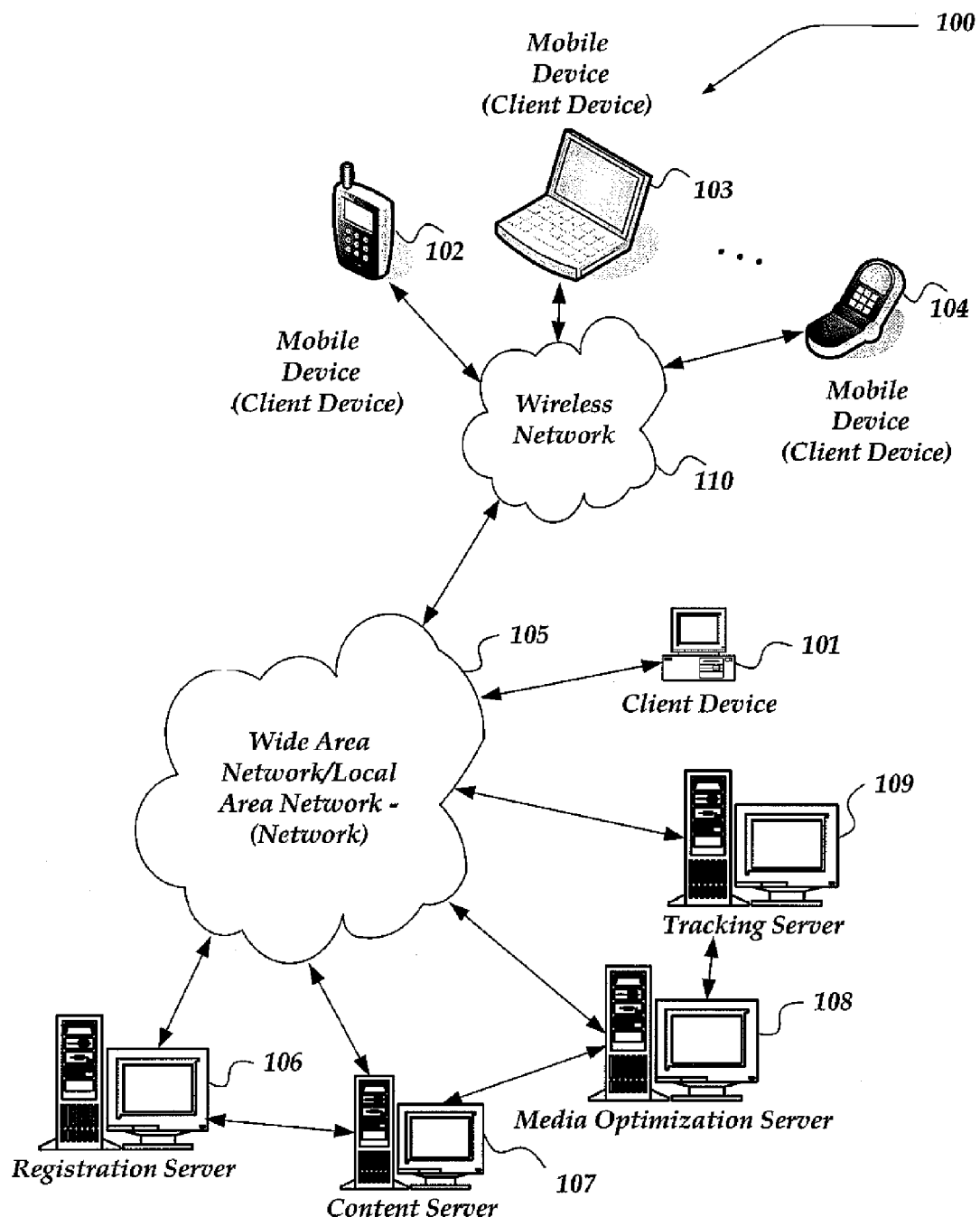
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes networks that enable communication between client and network devices or servers. A network 105 may comprise one or more local area networks ("LANs") and/or wide area networks ("WANs"). A wireless network 110 may comprise LANs, WANs, telephony networks, or the like. System 100 also includes a general purpose client device 101, mobile client devices 102-104, and servers 106, 107, 108, 109.

Example embodiments described herein can be implemented using one or more of the elements shown in FIG. 1. For example, code libraries, compiler and analysis software, data or code storage and so forth can be variously located at and/or accessed via one or more of the computer devices shown in FIG. 1, for example the servers 106-109 which can optionally also perform unrelated functions, one or more of the computer devices 101-104, and so forth. The compilation, analysis and code modification or enhancement techniques described herein can be performed by one or more of the computer devices shown in FIG. 1, with single or joint effect, and results of the process or results of portions of the process or sub-processes can be variously communicated within the system 100, stored onto computer readable media, and so forth.

The mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. The client computer device 101 may include virtually any computing device capable of performing computational functions and communicating over a network to send and receive information, including search query information, location information, social networking information, or the like. The set of such devices may include devices that typically connect using a wired or wireless communications medium such as personal computers, multiprocessor systems, microprocessor-based or programmable consumer electronics, network PCs, or the like.

Figure 2:
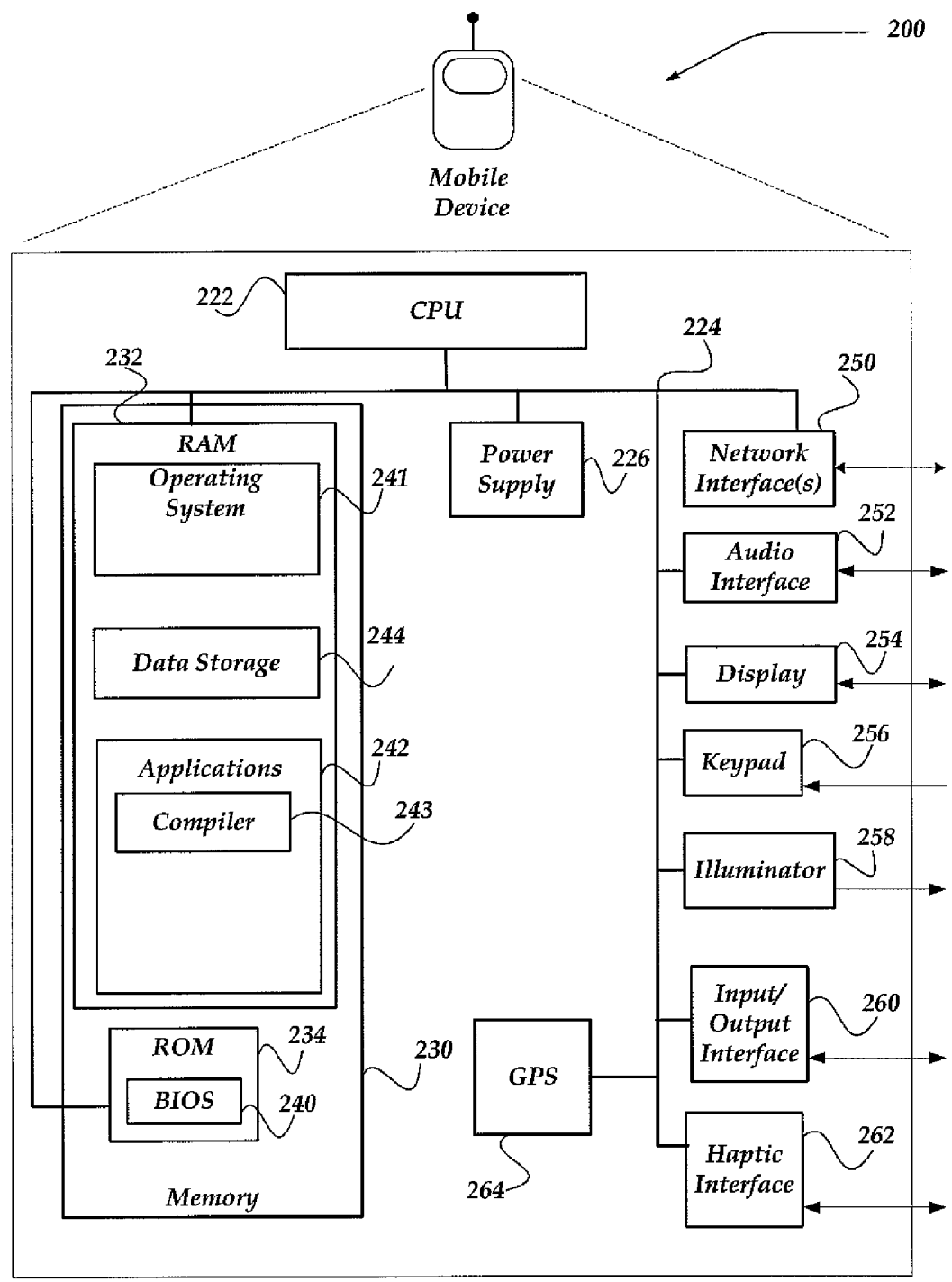
FIG. 2 shows one embodiment of a mobile device that may be included in a system implementing the invention.

FIG. 2 shows an embodiment of mobile device 200 that may be included in a system implementing one or more embodiments of the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in FIG. 2, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery. Mobile device 200 may optionally communicate with a base station (not shown), or directly with another computing device.

Keypad 256 may comprise any input device arranged to receive input from a user. Illuminator 258 may provide a status indication and/or provide light. The input/output interface 260 can be used for communicating with external devices, such as a headset, or other input or output devices not shown in FIG. 2. Haptic interface 262 is arranged to provide tactile feedback to a user of the client device.

Mass memory 230 includes one or more data storage 244, which can be utilized by mobile device 200 to store, among other things, applications 242 and/or other data. Applications 242 includes but is not limited to a compiler 243 arranged to perform the various functions of the example embodiments described herein. The memory 230 also includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory may also store an operating system 241 for controlling other operations of mobile device 200. It will be appreciated that this component may include a specialized client communication operating system such as Windows Mobile™, or the Symbian® operating system, or a general purpose operating system such as a version of UNIX, or LINUX™.

Figure 3:
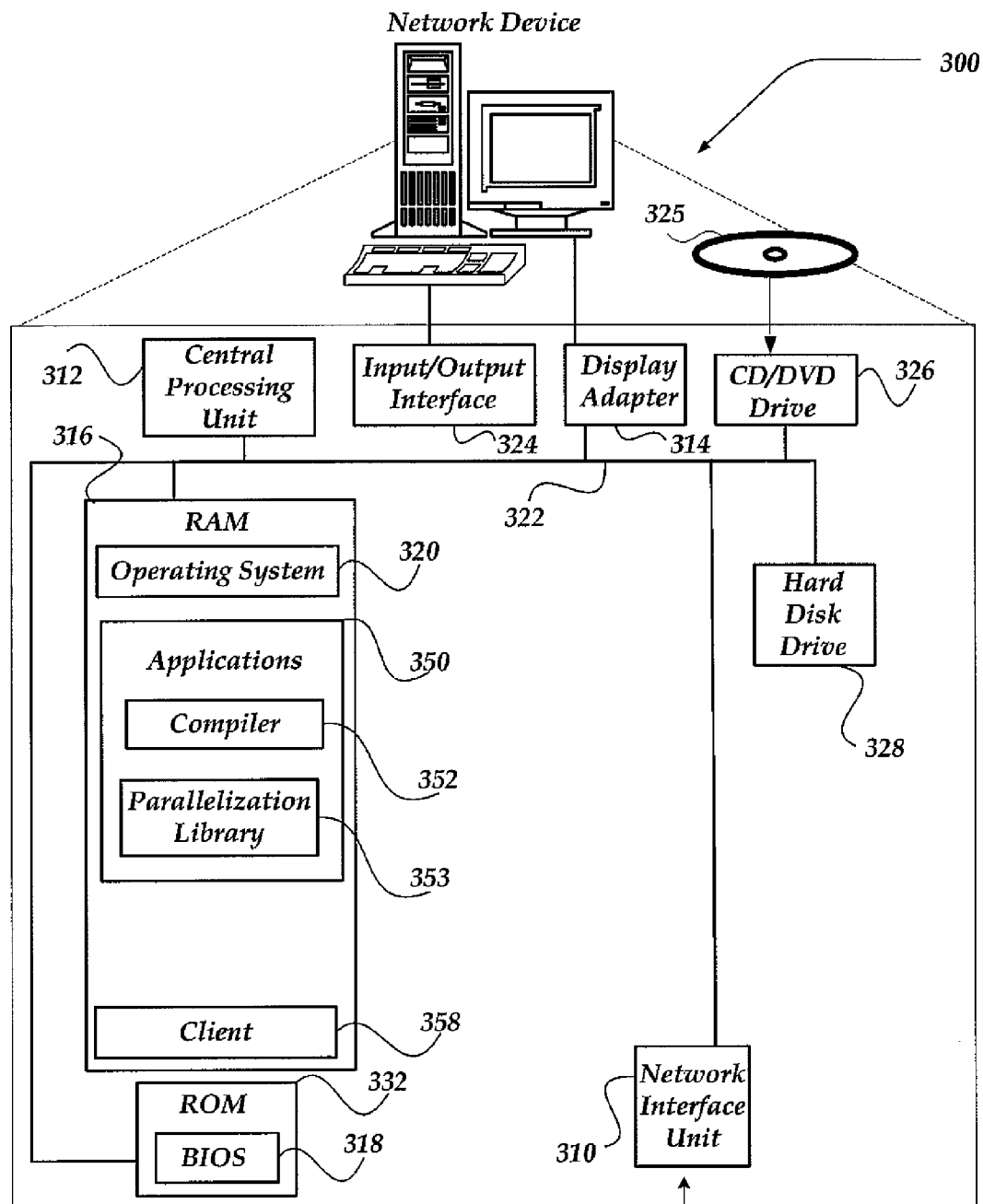
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, the server 106 and/or server 107 of FIG. 1.

Network device 300 includes a central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, CD/DVD drive 326 with optionally removable storage medim 325, and/or floppy disk drive. The mass memory stores operating system 320 for controlling the operation of network device 300. Any general-purpose operating system may be employed. Basic input/output system ("BIOS") 318 can be provided for controlling the low-level operation of network device 300. The network device 300 can communicate with the Internet, or some other communications network, via network interface unit 310.

The mass memory as described above illustrates another type of processor-readable media, storage media. Storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320, including a compiler 352 and parallelization library 353 arranged or configured to perform the various functions described herein. The mass memory can also include a client module 358, for example so that the network device can perform as, or perform the functions of, the client device 101 shown in FIG. 1.

Returning now to a discussion of parallel processing regimes, note that instructions can be performed speculatively, for example out of program order and/or before things upon which they may depend are known or determined. Prediction mechanisms can be employed to maximize or increase successful speculation, but recovery mechanisms are also needed to gracefully or effectively recover from situations where the speculation turned out to be incorrect. This can be useful for example with respect to transactional memory support, so that speculative load and store operations don't clash. Thus a compiler can speculatively schedule code for execution, but also provide remedial or recovery code so that if at run time there is a conflict, the remedial code can be executed to retrace or return to a point where program code can be executed differently to obtain a proper or correct result. The compiler can link in a runtime library to the runtime code. The runtime library can be, or can include, a parallelization library.

Transaction regions, as will be described in greater detail further below, can be used together with checkpoints so that speculative computational results from a transaction region are buffered but not released to main memory (not "committed") until it is clear they are correct. A checkpoint can be located or inserted at the beginning of such speculatively executed code to trigger oversight and/or allow the computer (via software and/or hardware) to identify dependencies at run time, and a checkpoint (or another checkpoint) or a commit instruction can be inserted at a later junction to determine whether the speculatively generated results are correct and can be committed.

In example embodiments disclosed herein, a compiler framework is described to automatically parallelize code or program loops which cannot be easily or effectively parallelized by existing techniques, and to generate code that implements or supports this function.

Example techniques described herein can be supported or enhanced via hardware transaction support including checkpoint/commit instruction pair(s), a special load ASI with which the load does not participate in, and hardware transaction disambiguation.

As described in further detail below, example embodiments include one or more of: a scheme or technique to insert checkpoint and commit instructions in a parallelization library for the purpose of speculative automatic parallelization; a mechanism or technique in the parallelization library for transaction failure control; mechanism in the compiler to scope certain scalar variables; and mechanism in the parallelization library to conduct reduction and copy-out operations for the purpose of speculative automatic parallelization.

In an example embodiment, a framework contains two parts: a compiler/parallelizer implementation to speculatively parallelize loops; and a parallelization library.

In this framework, only countable loops are processed, whose total iteration count can be determined before the loop is executed at runtime. The compiler processes loops from outer to inner along with the loop hierarchy graph. If one countable loop is a DOALL loop, it will be parallelized without speculation and all its children loops will not be processed further. (A loop is a DOALL loop if it does not have any inter-iteration dependences.) If one countable non-DOALL loop is found and it does not contain any other countable loops, then this loop will be parallelized with speculation.

In an example embodiment, a front end (e.g. a C, C++, FORTRAN, or other front end) translates source code(s) into an internal intermediate representation, which is the "code" processed by the parallelizer. For the loop to be parallelized, either speculatively or non-speculatively, the compiler will put the loop body along with runtime-to-be-determined loop "lower" bound, "upper" bound, and other information into a separate routine, which will be called "mfunction" herein. The "lower" and "upper" bound will partition the original work into several chunks which are to be executed by several threads. At runtime, the application will spawn several threads and each thread will execute this "mfunction" with properly computed lower and upper bound.

The compiler will do the work for variable scoping and outlining. The parallelization library will do the thread management and actual reduction and copy-out. In an example embodiment, the compiler and parallelization library are jointly responsible for transaction failure control.

Figure 4:
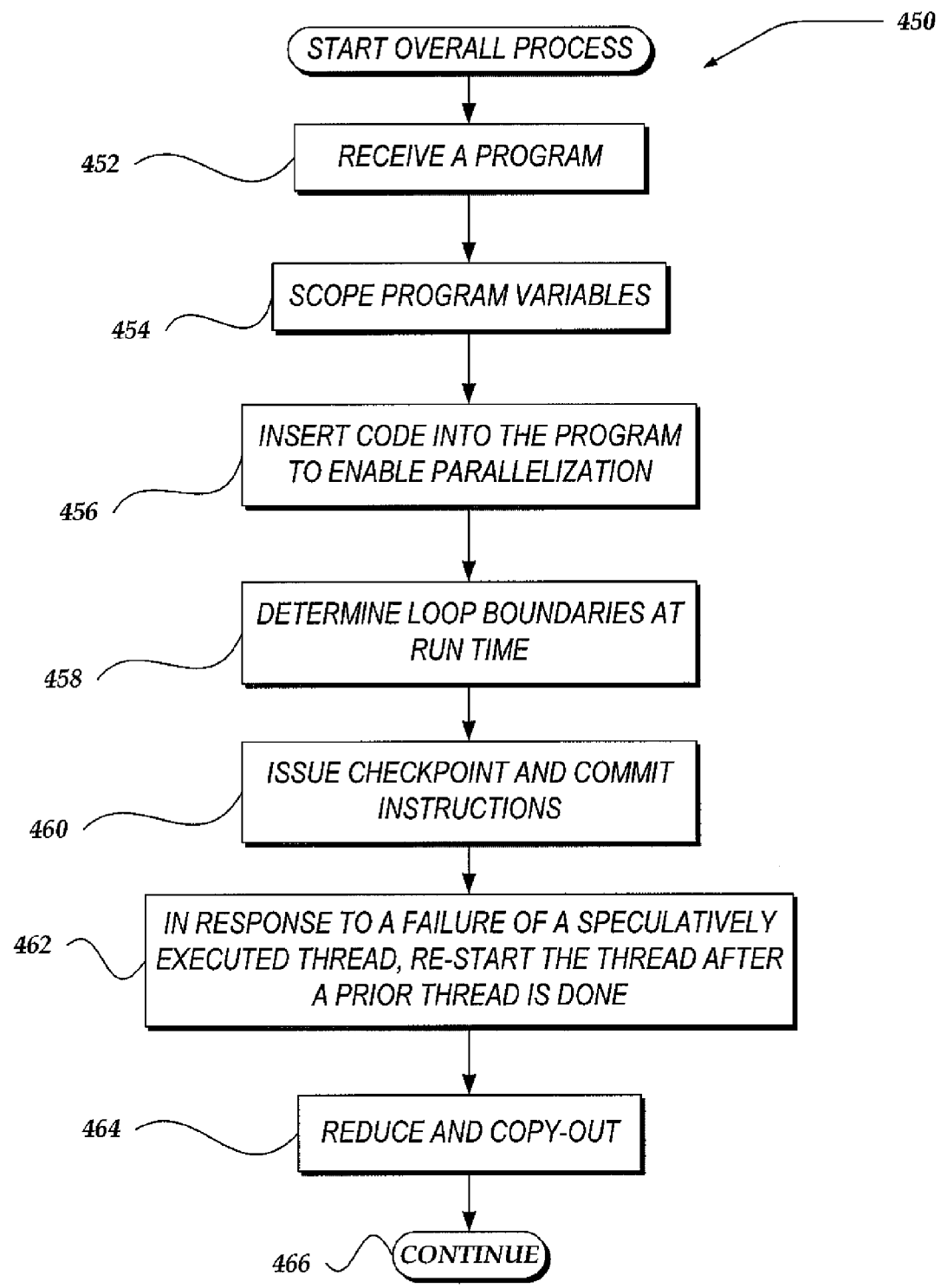
FIG. 4 illustrates an example process in accordance with example embodiments.

FIG. 4 illustrates an example process 450 wherein in a first block 452, a program is received to be parallelized. In a next block 454, variables of the program are scoped, for example scalar variables. In a next block 456, code is inserted, for example by the compiler, into the program to enable parallelization. In a next block 458, loop boundaries of the program are determined at runtime of the program, for example via routines provided by or accessed from the parallelization library. In a next block 460, checkpoint and commit instructions are issued while the program is running or executing, e.g. for parallelized loops in the program. In a next block 462, if a speculatively executed thread fails, it is restarted after a thread prior to it is done. In a next block 464, reduction and copy out are performed, for example by a main thread of the program. Details of these blocks will be described further below.

With respect to an example compiler framework for use with example embodiments, such a compiler framework can include two parts or functions. First, the compiler can perform "scoping" for each variable in the loop body. A purpose of "scoping" is to make sure variables are accessed correctly in semantics and to minimize shared variables to avoid frequent transaction failure. Second, the compiler can generate "mfunction" codes, which will be explained further below.

Several rules will apply to the process of scoping. Scoping is a process to determine how a variable is used in the outline body of the program code. There can be several common cases, as outlined below.

In a first case, "shared", if a variable is scoped as shared, then its use will become a load or store in the mfunction. A "shared" variable such as a scalar variable (i.e., a variable that can hold only one value at a time) can be used for load and/or store operations.

In another case, "copy-in", if a variable is scoped as copy-in, its value will be copied into a private variable inside mfunction as the initial value. Then, that private variable will be used in mfunction. "Private" generally means that the variable in question is a locally-defined variable, for example for use within a local loop or context. A "copy-in" variable can be copied-in with a load operation.

In another case, "copy-out", if a variable is scoped as copy-out, then its value at the last original loop iteration will be copied out and will be visible after the parallelized loop. A "copy-out" variable can be copied out with a store operation.

In another case, "reduction", a partial result will be computed inside mfunction. Partial results will be merged together across all threads.

Some currently available and known compilers have automatic parallelization (e.g. "autopar") scoping. In exemplary embodiment, such autopar scoping is re-used to ensure all memory access dependencies are preserved inside the "mfunction". For scalar dependencies, an example embodiment of the present invention follows these scoping rules: if a scalar is only involved in intra-loop dependence, this scalar will be scoped as "private"; otherwise, if a scalar is involved in reduction, it will be recognized as a reduction; otherwise, the scalar is involved in an inter-loop non-reduction dependence, and it will be scoped as shared.

Independently from scalar dependencies inside the loop, example embodiments also examine whether a scalar is defined inside the loop and used outside the loop, or not. For example, suppose the scalar is used outside the loop. If the scalar is guaranteed to be defined in the last iteration of the loop, then in example embodiments this variable is scoped as copy-out, otherwise, the variable is scoped as shared. If one variable is scoped as private based on inside loop dependence criteria, and is scoped as shared based on whether it is used outside the loop, it will be scoped as shared.

The scoping algorithm(s) described above can thus be used to scope scalar variables in example embodiments.

Some countable loops are not profitable for speculative parallelization. For example, a shared variable can be modified on every iteration, and therefore might not be a good candidate for speculative parallelization since transactions can (or will) fail for such cases. In such cases, example embodiments optionally do not perform speculative parallelization.

Now consider an example for applying these scoping rules/principles, Example 1:

```
s = 0.0; j = 1;
for (k = 0; k < n; k++) {
    p = foo (k);
    if (a[k]) continue;
    s = s + b[j];
    j = j + 1;
}
print (j, p, s);
```

In this Example 1 above, loop index "k" will be scoped as a private (locally defined) variable; variable "s" will be a reduction variable with reduction operator "+"; variable "j" will be scoped as shared; variable "p" will be a copy-out variable; and variables "a" and "b" will be copy-in variables.

The scoping rules and principles described above can be variously applied, for example, in block 454 of FIG. 4.

Figure 5:
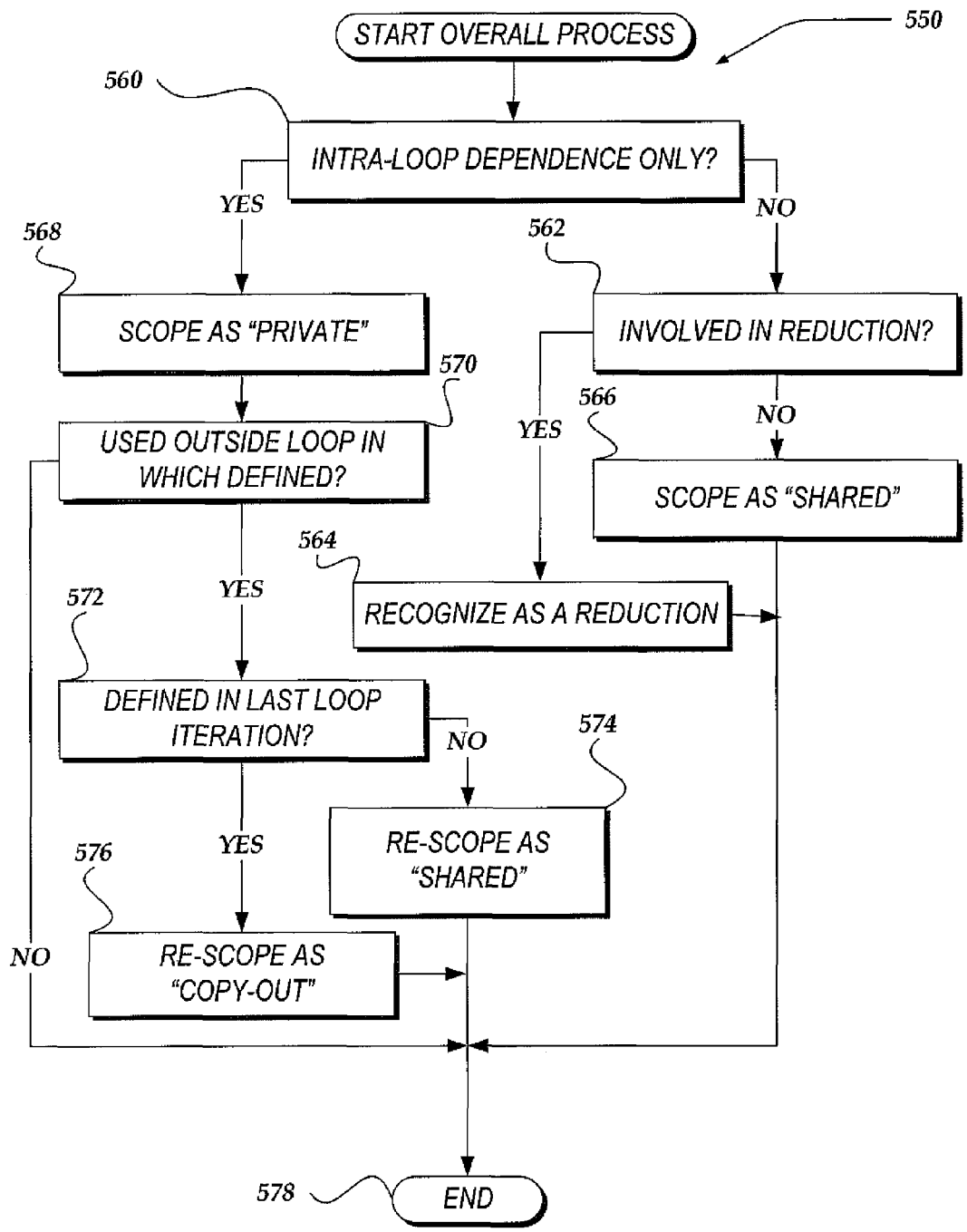
FIG. 5 illustrates an example process in accordance with example embodiments.

FIG. 5 illustrates an example process 550 for applying scoping rules, and which can be executed or performed by the compiler and/or at the compiling stage of the program being parallelized. In a first block 560, a determination is made whether a scalar of the program that is being parallelized, e.g. a scalar variable, only has intra-loop dependence.

If no, then control proceeds to block 562, where a determination is made whether the scalar is involved in reduction. If yes, then control proceeds to block 564 the scalar is recognized as a reduction, and from block 564 control proceeds to block 578 where this process or sub-process ends. If the determination at block 562 was yes, then control proceeds from block 562 to block 566 where the scalar is scoped as "shared", and from block 566 control proceeds to block 578 where the process ends.

If in block 560 the determination is yes, then control proceeds to block 568, where the scalar is scoped as "private". From block 568 control proceeds to block 570, where a determination is made whether the scalar is used outside the loop in which it is defined. If no, then control proceeds to block 570, where the process ends. If yes, then control proceeds from block 570 to block 572, where a determination is made whether the scalar is defined in a last iteration of the loop. If yes, then control proceeds from block 572 to block 576 where the scalar is re-scoped as "copy-out", and from there control proceeds to block 578 where the process ends. If in block 572 the determination is no, then control proceeds from block 572 to block 574, where the scalar is re-scoped as "shared", and from block 574 control proceeds to block 578 where the process ends.

Continuing now with Example 1 with respect to code generation, the pseudocode for the generated "mfunction" code will look like:

```
mfunction (argv, thread_id, lower, upper, last_original_index_value) {
    <get addr_of_original_j, addr_of_original_p from argv>
    <get copy_in_a, copy_in_b from argv>
    // Initialize local reduction variable.
    reduction_s = 0.0;
    for (k = lower; k <= upper; k++) {
        private_p = foo (k);
        if (copy_in_a[k]) {
            continue;
        }
        reduction_s = reduction_s + copy_in_b[shared_j];
        shared_j = shared_j + 1;
    }
    _mt_spec_reduction_ (addr_of_original_s, reduction_s,
        reduction_opcode, thread_id);
    if (k == last_original_index_value) {
        _mt_spec_copy_out_ (private_p, addr_of_original_p,
        thread_id);
    }
}
```

Note that in this example, the "mfunction" has a fixed signature as the above. The argument "argv" is a pointer array which contains a list of addresses to the shared, copy-in, copy-out and reduction variables. The argument "lower" and "upper" are computed by the parallelization library to define the work which should be done by each thread. The "last_original_k_value" is passed by the parallelization library which is the last value of loop index "k" for the original loop. This is used for copy out, in order to help determine when the copy out should happen.

Also note that the "thread_id" is used for reduction and copy out purpose. The main thread, which is non-speculative, has the thread id of 0. The non-main threads, which may or may not be speculative depending on whether the loop is parallelized speculatively, have the thread id from 1 to the number of non-main threads. For reduction, "thread_id" permits each thread to store its partial result free of data race. If the current thread is the "main" thread based on "thread_id", the reduction can be done directly. For copy out, "thread id" permits directly to copy out to the shared space if the current thread is the "main" thread.

With respect to the function "_mt_spec_reduction_" cited in the "mfunction" pseudocode, this function "_mt_spec_reduction_" is part of a parallelization library, and records reduction operations. The function "_mt_spec_copy_out_" is also part of the parallelization library and records copy-out operations. These two functions can perform actual reduction and copy out if the calling thread is the "main" thread. Otherwise, because a transaction may fail, the actual reduction and copy out will be done by the "main" thread after all threads are successfully committed.

With respect to parallelization library support, one parallelization library can be implemented to support speculative parallelization. In an example embodiment, the parallelization library implements one function which will be executed before the "main" function. The environment variable "SPEC_PARALLEL" (which can be named differently, and can have a format: setenv SPEC_PARALLEL <num_of_total_threads>) will be read and appropriate threads will be created. For example, "setenv SPEC_PARALLEL 3" will create two additional threads, and these additional threads will spin, waiting in the beginning, until instructed by the "main" thread to do some real work.

More details will be discussed below for how to use these global variables.

Example functions "_spec_MasterFunction_(argv, . . . )" and "_spec_slave_thread(thread_id)" will now be described. For a loop to be parallelized or speculatively parallelized, in an example embodiment the compiler outlines the loop into "mfunction" form and replaces the original loop with a function call to _spec_MasterFunction_, which is defined inside the parallelization library. The compiler can do this, for example, in block 456 of FIG. 4. In the runtime library initialization phase, before the "main" function takes place, a set of speculative threads are created, and the function _spec_slave_thread_ is executed or performed with argument "thread_id". (This can take place, for example, in block 458 and/or block 460 in FIG. 4).

The following shows an example pseudo code structure for _spec_MasterFunction_.

```
_spec_MasterFunction_ (argv, <other information>)
<BEGIN>
    if (_spec_master_func_entered_ > 0) {
        num_threads = 1; /* if nested parallel loop, then serialize loop's inner regions*/
    }
    else {
        num_threads = _spec_num_threads_;
    }
    _spec_master_func_entered_ ++;
    if (num_threads > 1) {
        <store "argv", "mfunction", and some information to compute lower/upper/last_value
        to some shared space>
        /* Notify speculative slave threads to start the work */
        for (int i = 1; i < num_threads; i++) _spec_thread_start_[i] = 1;
    }
    <compute lower, upper, last_value>
    if (num_threads > 1) {
        "mfunction" (argv, 0, lower, upper, last_value);
            /* Main thread finished its work */
        _spec_thread_done_[0] = 1;
        /* Wait for speculative threads to be done */
        while (_spec_thread_done_[num_threads - 1] == 0);
        /* Reset _spec_thread_done_ */
        _spec_thread_done_[num_threads - 1] = 0;
        /* Okay, done the work, do reduction and copy out here if needed. */
        _main_thread_final_reduc_ ( );
    }
    else {
        /* For nested parallelism or only one thread,
        */
        "mfunction" (argv, 0, lower, upper, last_value);
    }
    _spec_master_func_entered_ --;
<END>
```

Note that the "mfunction" code can be generated and inserted into (or otherwise associated with the target program being parallelized) in to the program code by the compiler, for example in block 456 of FIG. 4.

With respect to threading support, several global variables can be defined for synchronization between the "main" thread and all other speculative threads, including the following.

int_spec_thread_done_[MAX_NUM_THREADS]

When each thread has finished its work successfully, a bit can be set here.

int_spec_thread_start_[MAX_NUM_THREADS]

This variable can be used by the "main" thread to notify speculative threads to start doing real work.

_thread int_spec_master_func_entered_

This variable is defined as a thread local storage, e.g., each thread has a different copy. It will be used to control nested parallelism.

The following shows an example pseudo code structure for _spec_slave_thread_.

```
_spec_slave_thread_(int thread_id)
<BEGIN>
    StartPC:
        /* Wait for the signal to start */
        while (!_spec_thread_start_[thread_id]);
        /* Set this before checkpointing */
        _spec_thread_start_[thread_id] = 0;
        <compute lower, upper, last_value>
        if (<loop is parallelized speculatively>) {
            _checkpoint_(FailPC);
        }
        "mfunction" (argv, thread_id, lower, upper, last_value);
        /* wait for previous thread done and then commit */
```

```
        /* The load here should not cause transaction fail, i.e., it should be
    a*/
        /* non-transactional load.*/
      while (_spec_thread_done_[thread_id − 1] == 0);
    if (<loop is parallelized speculatively>) {
        _commit_ ( );
    }
    _spec_thread_done_[thread_id − 1] = 0;
    _spec_thread_done_[thread_id] = 1;
    goto SuccessPC:
FailPC:
/* wait for previous thread done */
    while (_spec_thread_done_[thread_id − 1] == 0);
    "mfunction" (argv, thread_id, lower, upper, last_value);
    _spec_thread_done_[thread_id − 1] = 0;
    _spec_thread_done_[thread_id] = 1;
SuccessPC:
    goto StartPC;
<END>
```

In particular, note that after finishing the work in "mfunction", each speculative thread will wait for its previous thread to be done in order to commit. For the main thread, it will wait for the last slave thread before finishing the parallel loop. This is logical when only the previous thread is done, since we can guarantee no further transaction failure.

In an example embodiment, the main thread is always non-speculative to make sure progress can be made at runtime. The checkpoint and commit instructions will be issued in the slave threads only if loops are parallelized speculatively. Otherwise, inserting checkpoint/commit instructions may unnecessarily make DOALL loops serialized if other events cause transaction failure.

As noted herein, checkpoints can be used to monitor transaction regions so that speculative computational results from a transaction region are buffered but not released to main memory (not "committed") until it is clear they are correct. A checkpoint can be located or inserted (e.g., in block 456 of FIG. 4) at the beginning of such speculatively executed code to trigger oversight and/or allow the computer (via software and/or hardware) to identify dependencies at run time (e.g., block 458 and/or 460 of FIG. 4), and a commit instruction or another checkpoint can be inserted at a later junction to help determine whether the speculatively generated results are correct or should be discarded and remedial code executed. The ending checkpoint can be, for example, similar to a trap, where if conditions are correct the results are committed, but if they are not then remedial code is called or executed to resolve the problem (e.g. go back or retrace and begin execution from an appropriate, e.g. verified, point or stage in the program). Thus a checkpoint can be used as an entry marker to a transaction region, and a (or another) checkpoint or commit can be used as an exit from the transaction region, to either commit or execute remedial code. Note that reduction and copy out typically occur after data and/or instructions have committed.

Note also that in example embodiments, the transaction region that is surrounded or encompassed by the checkpoint/commit contains or comprises two things: the outlined function that is needed to do the real work (e.g., an original function of the program being parallelized, for example a function that is useful or necessary to accomplishing an objective of the program); and the spin-waiting loop with non-transactional load that waits for the previous thread to finish before its own commit. In example embodiments, the transaction region contains substantially only those two things.

In example embodiments, transaction regions surrounded or marked by one or more checkpoints are selected to contain a minimum of extra commands or instructions, or to contain only necessary instructions, to minimize a number of computations (e.g. within the transaction region) that are checked by hardware. This can be desirable to conserve use of hardware resources, and provide attendant advantages of greater speed, lower cost, lower power consumption, and so forth. In an exemplary embodiment, specific commands or instructions (e.g. within and/or without a marked transaction region) such as non-transactional loads can be exempted from monitoring, to additionally or further conserve resources.

Thus, in example embodiments checkpoint and commit instructions can be provided in the parallelization library to enable or enhance speculative automatic parallelization.

In an example embodiment, some thread synchronization can be useful to enable or implement nested parallel looping. In an example embodiment, a thread local storage variable "_spec_master_func_entered_" is used for such an implementation. More complex data structures can be used to support non-serialized nested parallel loops.

In an example embodiment, the runtime library can support strip-mining such that the whole work is first divided into several "sub-group"s. Then, the work in each "sub-group" is done by the main thread and the speculative threads as discussed herein.

With respect to transaction failure control, when a transaction fails, control will transfer to FailPC as shown above in the pseudo code for slave function "_spec_slave_thread_". In the execution path following FailPC, the thread will first wait until its previous thread is done, then it will start to do its work again (e.g., block 462 of FIG. 4). In example embodiments, one speculative thread failure does not automatically require that the subsequent speculative threads be squashed or aborted. This is similar to the relation between non-speculative main thread and other speculative threads. Thus, a mechanism for transaction failure control is provided in the parallelization library.

With respect to Reduction and Copy Out support, in example embodiments the compiler and parallelization library support scalar reductions with the following types: char; unsigned char; short; unsigned short; int; unsigned int; long long¹ unsigned long long; float; double; and, long double. For integral types, in an example embodiment the compiler supports the following reduction operations: plus; minus; multiplication; max; min; bitwise-and; and, bitwise-or. For floating point types, in an example embodiment the compiler supports the following reduction operations: plus; minus; multiplication; max; min.

In an example embodiment, the "mfunction" will call the "_mt_spec_reduc_" function to record the reduction operation, and the parallelization library will allocate necessary space to keep such information. The actual reduction can be done after all speculative threads are known to have committed.

In an example embodiment, there is an exception for the "main" thread identified by thread_id parameter. For the "main" thread, the library will do reduction directly instead of storing the information and doing the reduction work later. This can be used to support nested parallelism. For an inner serialized parallelization construct, the reduction operation can be done solely by the "main" thread and will not pollute or corrupt the data structure used for the outermost parallelization construct.

In an example embodiment, the compiler and parallelization library supports the following types of copy out operation: char; unsigned char; short; unsigned short; int; unsigned int; long long; unsigned long; float double; long double; pointer; and, array. Similar to the reduction case, the "mfunction" calls _mt_spec_copy_out_ to record the copy out operation. In an example embodiment, the parallelization library will allocate space to store information and do actual copy out later. If the current thread is the "main" thread, the copy-out will be done immediately.

In example embodiments, reduction and copy-out can be done in one or more of tree ways or techniques, that can be performed or implemented for example in block 464 of FIG. 4.

In a first technique, reduction (e.g., merging of partial results) and copy-out are done by each thread immediately after commit, but before setting the "_spec_thread_done_" flag. This way, reduction can be done be done by each thread, and no lock/unlock is needed since its logically previous threads have done reduction/copy-out and its logically subsequent threads have not received the "_spec_thread_done_" signal from this thread yet.

In a second technique, reduction and copy-out is done by the main thread in an "eager" manner. After each thread is done, it will set a special flag to indicate that it has committed. In this situation the data structure _spec_thread_done_ is not used since its value may be reset by other speculative threads. Thus, the main thread will eagerly check the special flag and do the reduction and copy-out whenever possible.

In a third technique, reduction and copy-out is done by the main thread in a lazy manner. The main thread waits until all speculative threads are done, and then the main thread does the reduction and copy-out. (In an example embodiment, the main thread only waits for the last speculative thread is done, due to in-order commit requirement). This can be useful, for example, where the speculatively executed threads are sequential.

The algorithm pseudo codes described further above implement the lazy or third technique, but those skilled in the art will recognize that different implementations can be used, for example the first (immediate) or second (eager) techniques described above.

Thus, in example embodiments mechanisms are provided to conduct reduction and copy-out operations for the purpose of speculative automatic parallelization.

Thus, in example embodiments, support for nested parallelism is improved and enhanced, via frameworks that parallelize loops with function calls inside, thus enabling nested parallelism. In example embodiments described herein, all inner nested parallelism is serialized. More complex data structures can be used to support truly non-serialized inner parallel loops.

It will be understood that the methods described herein and each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention. The computer program instructions can be stored in computer readable media, for example memory chips, optical media such as CD ROM or DVD ROM disks, magnetic media such as floppy disks or magnetic tape, RAM (random access memory), and other storage media. In addition, example embodiments of the invention can be implemented in hardware, firmware, software, or combinations thereof.

Accordingly, methods and/or blocks of the flowchart illustration described or shown herein support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The examples provided should not be construed as narrowing the embodiments of the invention, and are intended merely to provide a better understanding. Thus, other mechanisms may therefore be employed, without departing from the scope of the invention.

The above specification, examples, and data provide a complete description of the manufacture and use of the composition of the invention. Since many embodiments of the invention may be made without departing from the spirit and scope of the invention, the invention resides in the claims hereinafter appended.

What is claimed as new and desired to be protected by Letters Patent of the United States is:

1. A method for parallelizing execution of a computer program, comprising:
    scoping program variables of the program at compile time of the program, including scoping scalar variables that are involved in an inter-loop reduction dependence as shared;
    inserting code into the program at compile time, wherein the inserted code comprises instructions for causing a computer to perform actions at run time of the program including:
    determining loop boundaries at run time;
    issuing checkpoint instructions and commit instructions that encompass transaction regions in the program, wherein each transaction region comprises a function needed to perform work of the computer program and a spin-waiting loop with a non-transactional load, wherein the spin-waiting loop waits for a previous thread to commit before the spin-waiting loop commits; and
    storing the program including the inserted code.

2. The method of claim 1, wherein the scoping further comprises:
    scoping a non-loop-index scalar variable that carries inter-loop non-reduction data dependences, as shared; and
    scoping a scalar variable that is defined in a loop prior to a last iteration of the loop and used outside the loop, as shared.

3. The method of claim 1, wherein the inserted code comprises instructions for causing the computer to perform, in response to a failure of a speculatively executed thread of the program, restarting the speculatively executed thread after a prior thread is done.

4. The method of claim 1, wherein the inserted code comprises instructions for enabling each thread in the program to perform reduction and copy-out immediately after commit.

5. The method of claim 1, wherein the inserted code comprises instructions for enabling a main thread in the program to perform reduction and copy-out for threads in the program in response to indications from the threads, wherein each of the indications indicates that a corresponding thread has committed.

6. The method of claim 1, wherein the inserted code comprises instructions for enabling a main thread in the program to perform reduction and copy-out after all speculative threads in the program are done.

7. Apparatus comprising a processor, wherein the apparatus is configured to:
receive a computer program;
scope program variables of the program at compile time, including scoping scalar variables that are involved in an inter-loop reduction dependence as shared;
insert code into the program at compile time, wherein the inserted code comprises instructions for causing a computer to perform actions at run time of the program, the actions including:
determining loop boundaries of the program at run time; and
issuing checkpoint instructions and commit instructions that encompass transaction regions in the program, wherein each transaction region comprises a function needed to perform work of the computer program and a spin-waiting loop with a non-transactional load, wherein the spin-waiting loop waits for a previous thread to commit before the spin-waiting loop commits;
store the program including the inserted code.

8. The apparatus of claim 7, wherein the apparatus is further configured to:
scope a non-loop-index scalar variable that carries inter-loop data non-reduction dependencies, as shared; and
scope a scalar variable that is defined in a loop prior to a last iteration of the loop and used outside the loop, as shared.

9. The apparatus of claim 7, wherein the inserted code comprises instructions for causing the computer to perform, in response to a failure of a speculatively executed thread of the program, restarting the speculatively executed thread after a prior thread is done.

10. The apparatus of claim 7, wherein the inserted code comprises instructions for enabling each thread in the program to perform reduction and copy-out immediately after commit.

11. The apparatus of claim 7, wherein the inserted code comprises instructions for enabling a main thread in the program to perform reduction and copy-out for threads in the program in response to indications from the threads, wherein each of the indications indicates that a corresponding thread has committed.

12. The apparatus of claim 7, wherein the inserted code comprises instructions for enabling a main thread in the program to perform reduction and copy-out after all speculative threads in the program are done.

13. A computer readable storage medium comprising instructions for causing a computer to perform:
scoping program variables of a computer program at compile time of the program, including scoping scalar variables that are involved in an inter-loop reduction dependence as shared;
inserting code into the program at compile time, wherein the inserted code comprises instructions for performing actions at run time of the program including:
determining loop boundaries at run time;
issuing checkpoint instructions and commit instructions that encompass transaction regions in the program, wherein each transaction region comprises a function needed to perform work of the computer program and a spin-waiting loop with a non-transactional load, wherein the spin-waiting loop waits for a previous thread to commit before the spin-waiting loop commits.

14. The medium of claim 13, wherein the scoping further comprises:
scoping a non-loop-index scalar variable that carries inter-loop non-reduction data dependences, as shared; and
scoping a scalar variable that is defined in a loop prior to a last iteration of the loop and used outside the loop, as shared.

15. The medium of claim 13, wherein the inserted code comprises instructions for performing, in response to a failure of a speculatively executed thread of the program, restarting the speculatively executed thread after a prior thread is done.

16. The medium of claim 13, wherein the inserted code comprises instructions for enabling each thread in the program to perform reduction and copy-out immediately after commit.

17. The medium of claim 13, wherein the inserted code comprises instructions for enabling a main thread in the program to perform reduction and copy-out for threads in the program in response to indications from the threads, wherein each of the indications indicates that a corresponding thread has committed.

18. The medium of claim 13, wherein the inserted code comprises instructions for enabling a main thread in the program to perform reduction and copy-out after all speculative threads in the program are done.

* * * * *